(12) United States Patent
Jaccard et al.

(10) Patent No.: US 8,334,483 B2
(45) Date of Patent: Dec. 18, 2012

(54) HEATING DEVICE WITH A MULTI POWERING CONFIGURATION

(75) Inventors: Alain Jaccard, Ste. Croix (CH); Pascal Mauroux, Chez-le-Bart (CH)

(73) Assignee: Nestec S.A., Vevey (CH)

( * ) Notice: Subject to any disclaimer, the term of this patent is extended or adjusted under 35 U.S.C. 154(b) by 494 days.

(21) Appl. No.: 12/707,443

(22) Filed: Feb. 17, 2010

(65) Prior Publication Data
US 2010/0206865 A1   Aug. 19, 2010

(30) Foreign Application Priority Data

Feb. 18, 2009  (EP) .................................... 09153076
Apr. 22, 2009  (EP) .................................... 09158428

(51) Int. Cl.
*F27D 11/00*   (2006.01)
(52) U.S. Cl. ....................................................... 219/442
(58) Field of Classification Search .................. 219/438, 219/442
See application file for complete search history.

(56) References Cited

U.S. PATENT DOCUMENTS

| | | | |
|---|---|---|---|
| 3,230,346 A | 1/1966 | Eckerfeld et al. | 219/307 |
| 4,242,568 A | 12/1980 | Wunderlin et al. | 219/296 |
| 4,595,131 A | 6/1986 | Ruskin et al. | 222/640 |
| 5,019,690 A | 5/1991 | Knepler | 219/400 |
| 5,392,694 A | 2/1995 | Muller et al. | 99/295 |
| 5,862,738 A | 1/1999 | Warne | 99/281 |
| 5,943,472 A | 8/1999 | Charles et al. | 392/396 |
| 6,246,831 B1 * | 6/2001 | Seitz et al. | 219/483 |
| 6,393,967 B2 | 5/2002 | Fischer | 99/285 |
| 6,459,854 B1 | 10/2002 | Yoakim et al. | 392/479 |
| 6,822,204 B2 * | 11/2004 | Clothier | 219/528 |
| 6,889,598 B2 | 5/2005 | Wroblewski | 99/275 |
| 7,286,752 B2 | 10/2007 | Gourand | 392/479 |
| 7,397,258 B2 * | 7/2008 | Suga et al. | 324/750.07 |
| 2006/0027103 A1 | 2/2006 | Boussemart et al. | 99/323.3 |

FOREIGN PATENT DOCUMENTS

CH   593 044 A   11/1977
(Continued)

OTHER PUBLICATIONS

Written Opinion and European Search Report, EP 09153076.6, dated Mar. 16, 2009.
(Continued)

*Primary Examiner* — Chandra Chaudhari
(74) *Attorney, Agent, or Firm* — Winston & Strawn LLP (57) ABSTRACT

A combination including a heater, a first connection device and a second connection device. The heater has heating elements or resistors; and a heater connector with electric heater conductors connected to the electric heating elements. The first and second connection devices have first and second output connectors with conductors for connection to the conductors of the heater connector and first and second input connector for connection to first and second standard connectors of first and second power sources with first and second voltage levels. The electric conductors of the first output connector have a first connection configuration in the first connection device and the electric conductors of the second output connector have a second connection configuration in the second connection device different to the first connection configuration. At least two heating elements are so connected to the first electric conductors as to be powered: in the first connection configuration via the first connection device to the first power source; and in the second connection configuration via the second connection device to the second power source.

20 Claims, 2 Drawing Sheets

FOREIGN PATENT DOCUMENTS

| | | |
|---|---|---|
| DE | 7433407 U | 3/1975 |
| DE | 197 37 694 | 10/1998 |
| DE | 197 32 414 | 2/1999 |
| DE | 103 22 034 | 12/2004 |
| EP | 0 353 425 | 2/1990 |
| EP | 0 485 211 | 5/1992 |
| EP | 1 253 844 | 11/2002 |
| EP | 1 380 243 | 1/2004 |
| EP | 1 646 305 | 4/2006 |
| EP | 1 686 879 | 8/2006 |
| EP | 1 764 014 | 3/2007 |
| EP | 1 767 129 | 3/2007 |
| EP | 1 809 151 | 7/2007 |
| EP | 1 864 598 | 12/2007 |
| EP | 1 867 260 | 12/2007 |
| EP | 1 878 368 | 1/2008 |
| EP | 1 992 263 | 11/2008 |
| FR | 1 289 545 | 2/1962 |
| FR | 1 299 354 | 6/1962 |
| FR | 2 799 630 | 4/2001 |
| GB | 607297 A | 8/1948 |
| JP | 02 260618 | 10/1990 |
| WO | WO 00/11914 | 3/2000 |
| WO | WO 01/54551 | 8/2001 |
| WO | WO 2004/006742 | 1/2004 |
| WO | WO 2004/062443 | 7/2004 |

OTHER PUBLICATIONS

Written Opinion and European Search Report, EP 09158428.4, dated Jul. 20, 2009.

* cited by examiner

HEATING DEVICE WITH A MULTI POWERING CONFIGURATION

FIELD OF THE INVENTION

The present invention concerns a heater adapted to be connected to different power sources having different electric characteristics, in particular the mains of different countries or geographical areas.

BACKGROUND ART

Liquid food and beverage preparation machines have been known for a number of years. For example, U.S. Pat. No. 5,943,472 discloses a water circulation system between a water reservoir and a hot water or vapor distribution chamber of an espresso machine. The circulation system includes a valve, metallic heating tube and pump that are connected together and to the reservoir via different silicone hoses, which are joined using clamping collars.

EP 1 646 305 discloses a beverage preparation machine with a heating device that heats circulating water which is then supplied to the inlet of a brewing unit. The brewing unit is arranged to pass heated water to a capsule containing a beverage ingredient for its brewing. The brewing unit has a chamber delimited by a first part and a second part movable relative to the first part and a guide for positioning a capsule in an intermediate position between the first and second parts before moving the first and second parts together from an open to a closed configuration of the brewing unit.

In-line heaters for heating circulating liquid, in particular water are also well known and are for example disclosed in CH 593 044, DE 74 33 407, DE 103 22 034, DE 197 32 414, DE 197 37 694, EP 0 353 425, EP 0 485 211, EP 1 380 243, FR 1 299 354, FR 2 799 630, U.S. Pat. No. 4,242,568, U.S. Pat. No. 4,595,131, U.S. Pat. No. 5,019,690, U.S. Pat. No. 5,392,694, U.S. Pat. No. 5,862,738, U.S. Pat. No. 5,943,472, U.S. Pat. No. 6,393,967, U.S. Pat. No. 6,889,598, U.S. Pat. No. 7,286,752, WO 00/11914, WO 01/54551, WO 2004/006742 and WO2004/062443.

For instance, FR 1 299 354 discloses a single in-line water heater device that can be integrated in different apparatus requiring different heating powers. The heater device has several heating resistors which are connected to the power circuit of such an apparatus and the terminals of which are insulated and extend outside the device for connection. To set the appropriate heating power of the heater, the terminals of the different resistors are so connected to the power circuit of the apparatus to provide a serial, parallel, star or delta configuration of the resistors of the heater device, whereby the heating power of the heater device is adjusted to the power needed by the apparatus. GB 607,297 discloses a system allowing a selection by a user of a particular heating power from a group of predetermined heating power levels for a heating apparatus, such as a heater or a heating plate or a cooker. In this case, the heating apparatus includes several heating resistors that are electrically connected in a serial or parallel configuration by means of a combination connector device between the heating apparatus and the electric distributor circuit. The combination connector device comprises: a base assembly fixed on the wall adjacent to the heating apparatus and connected to the distributor circuit; and a plug assembly connected to the resistors of the heating apparatus. The plug assembly has three pins connected to the resistors. The plug assembly has a series of sockets onto which the plug may be connected. Each socket has a different inter-connection so as to provide a different serial or parallel configuration of the resistors when the plug is connected to the socket. Hence, moving the plug along the base from one socket to another changes the resistor configuration of the heating apparatus and thus the heating power thereof when the socket assembly is connected to the electric distributor circuit.

A fine adjustment of the heating power is disclosed in WO 01/54551. This document discloses an in-line heater having a permanently powered first heating resistor for pre-heating water circulating in the heater and a second heating resistor that is automatically switched on and off as required for adjusting the temperature of the pre-heated water to reach a target temperature. Similarly, EP 1 380 243 discloses an in-line heater with three resistors and three switches that are so interconnected to provide various serial, parallel and mixed resistor configurations switchable automatically to allow fine adjustment of the heating power generated by the resistors and adjust precisely the temperature of the heated water.

One problem encountered with the conception of beverage machines relates to the different domestic voltage levels used in different places and countries. For example, domestic nominal base voltages in different places are generally: 220-230 VAC in Europe and China and Argentina, 120 VAC in the US, between 110 and 220 VAC depending on the area in Brazil and Colombia, 100 VAC in Japan, 240 VAC in Australia and Kuwait, etc. . . . Hence, a beverage machine must either be dedicated for a single electric power supply area or must include a means to adapt to the different domestic voltage supply of different areas.

For example, U.S. Pat. No. 5,862,738 discloses a beverage preparation machine that is arranged for including one of two separated heater elements, namely a first heater element that can be operated with 115 VAC and a second heater element that can be operated with 230 VAC. This requires the switching of the heater elements when the power supply is changed.

EP 0 353 425 discloses a heater for a beverage machine that has two heating resistors and a switch so inter-connected together that the resistors may be switched from a parallel into a serial configuration and vice versa by operating the switch. Hence, by switching the resistor configuration, the heater is adapted for a 110 and 220 V, providing the switching is done properly to fit the characteristics of the power source. DE 74 33 407 discloses a coffee machine with a similar resistor configuration that may be switched. FR 1 289 545 discloses a similar system for a soldering iron in which the user-switch for switching between the parallel and serial resistor configurations is incorporated in the plug of the device's power cord. In all these cases, the user may select a proper switch configuration to adjust the device to the power source. This, of course, involves the risk of improper user-configuration and safety risks or at least malfunction of the devices in case of improper powering thereof.

A solution to this problem has been proposed in WO 00/11914. This application discloses a direct electrical heater having a pair of electrodes with a power supply for passing an electric heating current between the electrodes via the liquid circulated in a beverage machine. The heater includes a power supplier connectable to the mains which provides 120-480 V having a frequency of 50-60 Hz at 10-75 Amp. The heating rate is proportional to the power supply and thus depends on the voltage of the mains. The power supply may though be controlled by a variable switch for limiting the percentage of time of current supply. To minimise the flickering effect the power supply includes, in series, an AC/DC converter, a voltage level controller and a DC/AC converter, the voltage level controller being adjustable to control the voltage that is then supplied to the electrodes via the DC/AC converter. Such double conversion systems are quite expensive and lead also to significant power loss in the conversion.

WO 2004/062443 discloses a beverage preparation apparatus having a power circuit that can be used with different types of external supply voltages, domestic or foreign. The power circuit includes a heater that is directly coupled via an on/off switch to the foreign or domestic voltage supply in the range of 88 to 264 V at a frequency of 47-63 Hz. The apparatus also has a power supply, mounted in parallel with the heater, that converts the voltage supply into 5, 12, 24 or 30 VDC for powering a controller, a pump, a display and lights of the apparatus. The controller is arranged to send control signals for controlling the operating of the power circuit via the on/off switch.

A problem with this latter arrangement lies in the fact that the heater of the power circuit will be over-dimensioned or under-dimensioned depending on the type of electric supply. For higher voltage supply, e.g., 240 V, this will lead to excessive switching, to reduce the length of the powering periods of the heater during a heating cycle, and high power peaks during the powering periods with the resulting risk of inadmissible flickering and/or electromagnetic interference (EMI), inadmissibly high instantaneous current consumption and/or inadmissibly large temperature variations of the water. For lower voltage supply, the heater will not be able to generate enough heat for heating larger quantities of water.

SUMMARY OF THE INVENTION

The invention now overcomes the drawbacks of the prior art, in particular those discussed previously, by providing a simple architecture of a heater or heating device, advantageously for a beverage dispensing machine, wherein the heater or heating device is operable with different voltage levels.

The heating device of the invention is particularly used in a beverage machine that is operable with different voltage levels. The heater has a more or less or substantially constant nominal power adjusted to the needs of the heating application irrespectively of the voltage level of the household or office electric supply circuit, e.g., the mains.

The invention thus relates to a combination of a heating device for a liquid food or beverage machine and two connection devices. The heating device comprises a heating chamber for containing liquid, such as water, to be heated; a plurality of electric heating elements that are in thermal communication with the heating chamber; and a heater connector with electric heater conductors connected to the electric heating elements. The first connection device has a first output connector, such as a socket, with conductors for connection to the conductors of the heater connector; and a first input connector, such as a first plug, for connection to a first standard connector of a first power source with a first voltage level, such as a first domestic mains and connector, e.g., first socket, of a given geographical area. The second connection device has: a second output connector, such as a socket, with conductors for connection to the conductors of the heater connector; and a second input connector, such as a plug, for connection to a second standard connector of a second power source with a first voltage level, such as the domestic mains and connector, e.g., second socket, of a second different geographical area.

The second input connector, second standard connector and second voltage level are different to the first input connector, first standard connector and first voltage level, respectively.

In accordance with the invention, the conductors of the first output connector have a first connection configuration in the first connection device and the conductors of the second output connector have a second connection configuration in the second connection device different to the first connection configuration. At least two of the electric heating elements are so connected to the first electric conductors as to be powered: in the first connection configuration via the first connection device to the first power source with the first voltage level; and in the second connection via the second connection device to the second power source with the second voltage level.

In other words, the electric heating elements are connected to a plurality of electric interface conductors of the heater. By connecting these interface conductors and/or by not connecting one or more of these interface conductors to the power source such as the mains, different connection configurations of the electric heating elements may be provided with different heating responses of the heating elements to a power input. Hence, the heater may be adapted so that its heating response is substantially the same when connected to different power sources by providing the appropriate connection configuration of the heating elements via a corresponding connection of the interface conductors to the power source. Such corresponding connection will be provided by the connection device dedicated for connecting the interface of the heater to the corresponding power supply.

Hence, in a preferred embodiment, the electric heating elements of the heater have a nominal power that is substantially constant whether connected via the first connection device to the first power source with the first voltage level or whether connected via the second connection device to the second power source with the second voltage level. Hence, the nominal power of the arrangement of the heating elements is determined by the power source in combination with a connection device dedicated for this power source and its electric characteristics.

In another preferred embodiment, the first input connector is incompatible with the second standard connector and the second input connector is incompatible with said first standard connector. Hence, the specific shape and mechanical characteristics of the connection between the connection device and the power source, e.g., the mains, is used as an anti-error mechanism or fool proofing mechanism for the user to select the connection device with the appropriate connection configuration for the heating elements which is adjusted to the electric characteristics of the power source.

To make the system totally fool proof, each connection device has a permanent connection configuration that cannot be modified by a user. Normally, the electric configuration is permanently sealed within an electric cord for connecting the heater, or the appliance including the heater, to the power source. Hence, the user should be prevented from modifying the connection configurations since these are specifically aligned to the particular type of input connector of the connection device to match the voltage characteristics of the power connector corresponding that fits the input connector.

Typically, the heating chamber is located within a heater body associated with the heating elements. It is also possible to provide a heating chamber extending within several heater bodies, e.g., successive heater bodies along the liquid flow path. For instance, a first heater body is associated with a first heating element and a second heater body is associated with a second heating element. Moreover, the heater may also include several heater bodies, each being associated with a plurality of heating elements. In an embodiment, a first heater body with its heating elements is arranged for providing hot water, which may be selectively put in line with a second heater body with its heating elements for evaporating the hot water whenever vapour is needed. Further embodiments of heaters including several heater bodies are for example disclosed in EP 1 764 014.

Such electric configurations of the heating elements may typically include one or more configurations of the heating elements selected from an individual powering configuration, a parallel powering configuration, a serial powering configuration, a star configuration (Y-configuration) and a delta configuration (Δ-configuration).

Hence, by selecting the characteristics of the different heating elements, either identical or different characteristics, the heater may be arranged for a substantially constant overall nominal power adapted to various voltage levels of different power supply sources, e.g., by connecting the heating elements, individually, in parallel or serial arrangement or a combination thereof. The connection arrangement is, however, provided in the connection device that has a connector, e.g., a plug, designed for a standard power supply connector, e.g., a socket, of an area with a specific nominal domestic voltage level.

Plug and sockets may of course be inverted, i.e. the power voltage source may have a plug connector that is adapted for a socket connector of a connection device, depending on the relevant standard.

Hence, to adjust the heating characteristics of the heater to a particular power source, it is not necessary to replace the heating elements or provide a heater with different heating elements. It is sufficient to provide an appropriate connection device between the heater and the power source. To avoid any user error, the connection device does not allow any user-modification of its electric configuration.

Moreover, by allowing a simple electric reconfiguration of the heating elements of the heater via appropriate connections external to the heater, the heating elements will not be powered beyond acceptable levels regarding the electric capacity of the power source or fail to meet the required minimum heating capacity of the heater.

For example, a coffee machine will typically use a heater having a heating power of about 1500 W. By providing a pair or resistors of 16 ohm each, a serial mounting in a 220 VAC circuit will generate 1512 W at less than 7 amps and a parallel mounting in a 110 VAC will also generate 1512 W at 14 amps. Hence, the heater of the invention will generate the same nominal power whether used in a 110 VAC circuit or in a 220 VAC circuit and will not exceed the admissible current of domestic systems.

For an espresso machine, in which a small amount of hot water is required, the heater will only need to produce the equivalent of about 400 W, which means that the heater will only be intermittently powered for about 25% of the time. Whereas, for preparing a large size coffee or two medium size coffees at the same time, the heater will have to develop a power close to 1500 W, which means that it will have to be connected substantially continuously.

In comparison with the heater disclosed in WO 2004/062443, a single resistor would have to be able to produce 1500 W at 110 VAC, which means that a resistor of not more than 8 ohm would be needed. However, when connected to 220 VAC, this same resistor would allow the passage of a current of 27 amps and develop up to 6000 W. Obviously, such a high current would exceed the maximum admissible level in various places. Moreover, to produce an espresso, requiring 400 W, the heater would have to be intermittently switched on for 6-7% of the heating cycle. This leads to narrow peaks of high current consumption and electromagnetic interference problems as well as uneven heating which may not be acceptable.

For finer adjustments of the heater and for providing a larger number of voltage compatibilities, at least three heating elements may be provided in the heater. In this case, the electric configurations can include one or more configurations of these three heating elements selected from an individual powering configuration, a parallel powering configuration, a serial powering configuration and combinations thereof. To even further increase the connection and adjustment flexibilities, the heater may have 4, 5, 6 or more resistors.

The heater may comprise a heating element that is separately connected between a pair of dedicated first electric conductors. The heater can include a heating element that is connected between a pair of electric conductors, a further heating element being connected to one conductor of this pair of electric conductors and connected to a further electric conductor.

The heater may include one or more circuit breakers, over-voltage fuses or electric safety switches. Such components can be useful in the unlikely event that a user tampers with the connection to the electric source or uses a plug adapter to connect the connection arrangement to an electric source that has inadequate characteristics for the connection arrangement. Such components, in particular electrically controlled on/off switches such as triacs and the like, can be used to adjust the powering of the heating elements to provide an appropriate heating profile as may be required. For example, the heater includes a plurality of heating elements of the types disclosed in EP 1 253 844, EP 1 380 243 or EP 1 809 151.

Suitable switches may include zero-switches, i.e., switches which are commuted at the passage of the alternating current or tension at 0, positive phase zero-switches or negative phase zero-switches.

The heating elements may typically comprise one or more heating resistors, in particular discrete or integrated resistors or thick-film type resistors. Several resistors may also be provided as resistive sections in the same resistive body by providing the resistive body with more than two connection possibilities at various locations of the resistive body whereby several current paths are generated within the same resistive body depending on the connection configurations. A resistor may also have a varying resistance along its length to change correspondingly the heating power generation along its length.

Usually, the heater connector has electric conductors connected to a low voltage unit, in particular a unit that is associated with an AC/DC converter connected to such electric conductors, for powering a low voltage circuit. These conductors, for the low voltage unit, in particular an AC/DC converter, should then be powered in all connection configurations in which the low voltage circuit is active. One or more of these electric conductors for the AC/DC converter may also be used to connect one or more heating elements to the power source.

The heating chamber for containing liquid can be an in-line heating chamber and may in particular have a heating conduit for guiding a circulating liquid to be heated.

For instance, the in-line heating chamber is located within a thermoblock. Thermoblocks are typically in-line heaters through which a liquid is circulated for heating. They comprise a heating chamber, such as one or more ducts, in particular made of steel such as stainless steel, extending through a (massive) mass of metal, in particular made of aluminium, iron and/or another metal or an alloy, that has a high thermal capacity for accumulating heat energy and a high thermal conductivity for the transfer the required amount of the accumulated heat to liquid circulating therethrough whenever needed. Instead of a distinct duct, the thermoblock's duct may by a through passage that is machined or otherwise formed in the duct's body, e.g., formed during a casting step of the thermoblock's mass. When the thermoblock's mass is made of aluminium, it is preferred, for health considerations, to provide a separate duct, for example of steel, to avoid contact between circulating liquid and aluminium. The block's mass can be made of one or several assembled parts around the duct. Thermoblocks usually include one or more resistive heating elements, for instance discrete or integrated resistors, that convert electrical energy into heating energy. Such resistive heating elements are typically in or on the thermoblock's mass at a distance of more than 1 mm, in particular 2 to 50 mm or 5 to 30 mm, from the duct. The heat is supplied to the thermoblock's mass and via the mass to the circulating liquid. The heating elements may be cast or housed into the metal mass or fixed against the surface of the metal mass. The duct(s) may have a helicoidal or another arrangement along the thermoblock to maximise its/their length and heat transfer through the block.

Any heating device may be used as the heater of the present invention.

The heater may in particular comprise a thermoblock with a metal mass that incorporates an inlet, an outlet and a heating chamber extending therebetween, the mass being arranged to accumulate heat and to supply heat to the liquid. The thermoblock typically includes one or more electric heating elements that may be rigidly secured onto or into the thermoblock and that can be connected to a printed circuit board (PCB) and/or a flex-print arranged to control such thermoblock and optionally further functions.

The heater also may be an on-demand heater, for instance as disclosed in the abovementioned EP 1 253 844, EP 1 380 243 or EP 1 809 151. Alternatively, the heating chamber for containing liquid can be a heating reservoir for heating batches of liquid accumulated in the reservoir.

The heater may be included in a beverage preparation machine, the beverage preparation machine and the heater being connectable to a power source via one of the connection devices.

Usually, the output connectors of the connection devices are disconnectably connectable to the heater connector by a user, e.g., pluggable and unpluggable, without effort or destruction of the devices. Likewise, the input connectors of the connection devices are usually disconnectably connectable by the user to corresponding connectors of the different power sources in the same manner.

The electric connection device may have an input connector that is configured to be connectable to the connector of a power source, such as the mains, having specific voltage characteristics; and an output connector with a plurality of conductors that are connectable to the conductors of a heater connector. The conductors of the connection device have an electric configuration arranged for powering the heating elements of the above heater in accordance with the specific voltage characteristics of the power source for which the input connector is configured for direct connection thereto.

Typically, the connection device is in the form of an electric cord for domestic power supply.

Normally, the standard input connector, or the device's power source connector, of the connection device is a plug, in particular a plug in the group of plugs of type A to M, for instance a Japanese plug (e.g., JIS C 830), North American plug (e.g., NEMA 1-15, 5-15 or 5-20), European plug (e.g., CEE 7/4, 7/7, 7/16, 7/17), Indian plug (e.g., BS 546), etc. . . . and is thus adapted for a corresponding socket of the local electric supply (e.g., the domestic mains) with the corresponding electric characteristics associated with the geometry and mechanical features of the connection.

Another aspect of the invention relates to a set of two connection devices suitable for a combination with a heater that has a plurality of electric heating elements as described above. The set comprises a first connection device and a second connection device. The first connection device has a first output connector with conductors for connection to conductors of a heater connector; and a first input connector for connection to a first standard connector of a first power source with a first voltage level. The second connection device has a second output connector with conductors for connection to the conductors of the heater connector; and a second input connector for connection to a second standard connector of a second power source with a second voltage level. The second input connector, standard connector and voltage level are different to the first input connector, standard connector and voltage level, respectively.

In accordance with the invention, the second electric conductors of the first output connector have a first connection configuration in the first connection device and the second electric conductors of the second output connector have a second connection configuration in the second connection device different to the first connection configuration. The connection configurations are so arranged that at least two of the electric heating elements connected to the first electric conductors are powered: in the first connection configuration via the first connection device to the first power source with the first voltage level; and in the second connection configuration via the second connection device to the second power source with the second voltage level.

Hence, the invention also relates to a set of electric connection devices as described above. The set comprises different electric connection devices arranged for different voltage sources with different voltage characteristics and different connectors. Hence, a heater, in particular within a beverage machine, may be supplied with different electric connection devices to provide a uniform packaging process of the heaters.

Furthermore, the invention also concerns a beverage preparation machine that comprises a heater in combination with connection devices as described herein.

For the purpose of the present description, a "beverage" is meant to include any liquid food, such as tea, coffee, hot or cold chocolate, milk, soup, baby food, etc.

The beverage preparation machine is in particularly a machine arranged to produce a beverage using a pre-portioned beverage ingredient such as e.g., capsules or pods containing ground roasted coffee or soup ingredients. Beverage machines of this type are for example disclosed in EP 1 646 305, EP 1 686 879, EP 1 767 129, EP 1 878 368, EP 1 864 598, EP 1 867 260 and EP 1 992 263.

The pre-proportioned ingredient batches may be supplied within packages, typically capsules, to the production machine or may be formed in the machine by supplying a predetermined amount of ingredient from an ingredient reservoir of the machine. Optionally, the ingredient supplied from the reservoir may be transformed before liquid is fed thereto. For example, the ingredient is ground coffee that is supplied to the production machine within packages or from a reservoir of the machine containing a stock of bulk ground coffee. Alternatively, the ingredient is in the form of bulk coffee beans stored in a reservoir and supplied in batches therefrom and ground before the liquid is fed.

In such a machine, liquid such as water is typically circulated, for instance from a liquid reservoir via a pump, through the above heater. From the heater, the heated liquid can be guided into a machine's brewing chamber in which an ingredient may be brewed. The brewing chamber may include a capsule or pod housing, e.g., receiver, for housing an ingredient supplied within a capsule or pod into the brewing chamber.

For instance, the brewing chamber is arranged to contain a beverage ingredient, such as powder soup, ground coffee or tea optionally in a capsule or a pod. The brewing chamber may have an upstream part into which hot liquid is injected for brewing the beverage ingredient contained in the chamber and a downstream part leading into an outlet for guiding the liquid food or beverage produced by brewing.

A typical configuration of a suitable brewing chamber is disclosed in EP 1 646 305.

Moreover, another aspect of the invention relates to a combination of such a beverage preparation machine and one or more connection devices, or a set of connection devices, as described above.

A further aspect of the invention relates to a combination of a heating device for a liquid food or beverage machine and a connection devices for directly connection of the heating device to a dedicated power sources. The heating device comprises a heating chamber for containing liquid, such as water, to be heated; a plurality of electric heating elements that are in thermal communication with the heating chamber; and a heater connector with electric conductors connected to the electric heating elements. The connection device comprises: an output connector with electric conductors that are disconnectably connectable by a user to the electric conductors of the heater; and an input connector, such as a plug, that is configured to be connectable directly to a standard power supply connector, such as a socket, of a voltage supply of an area having a specific nominal domestic voltage level.

In accordance with the invention at least two of said electric heating elements are so connected to the heater conductors as to be powered in a connection configuration that depends on an electric configuration of the conductors in the connection device, the electric configuration in the connection device being permanent, non-modifiable by a user and adapted to its input connector that is dedicated for said power supply connector of said voltage supply.

This combination may also include a further connection device of the same type having, however, a different input connector adapted to be connected directly to a standard different connector of a standard voltage supply of an area having a different specific nominal domestic voltage level. This further connection device includes a different electric configuration adapted for powering the heater's resistors with the latter nominal domestic voltage that is different.

This combination may also include one or more of the other features mentioned herein.

BRIEF DESCRIPTION OF THE DRAWINGS

The invention will now be described with reference to the schematic drawings, wherein.

DETAILED DESCRIPTION OF THE PREFERRED EMBODIMENTS

Figure 1:
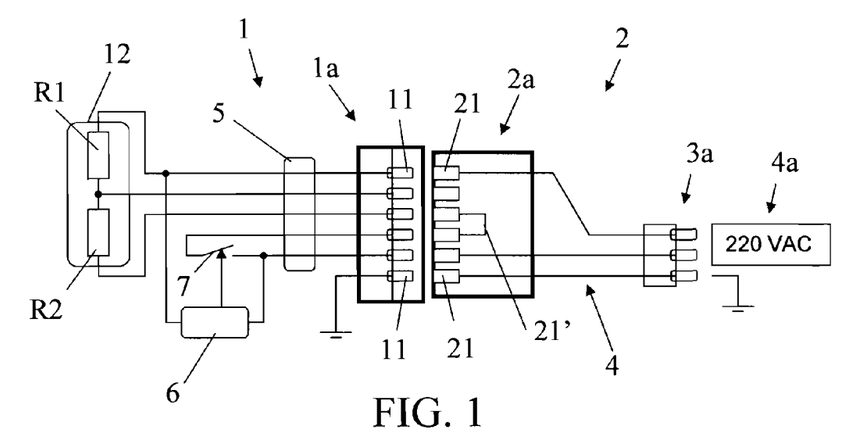
FIGS. 1 and 2 schematically show a two-resistor heater in accordance with the invention that is connected to two different connection devices in accordance with the invention.
Figure 2:
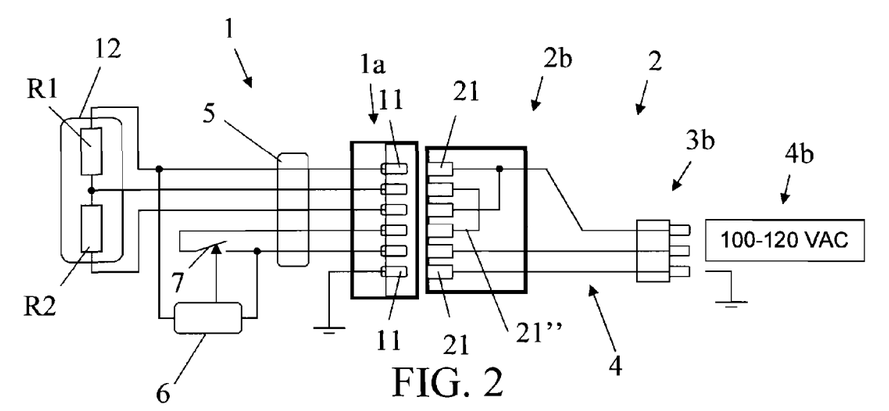

FIGS. 1 and 2 show a heater 1 for a liquid food or beverage machine and a connection device 2 for connecting heater 1 to the a power source, in particular a domestic power source such as the mains 4a,4b. Connection device 2 is in the form of an electric cord having an electric cable 4 extending between a socket connector 2a,2b and a plug connector 3a,3b that is connectable to a corresponding socket of a domestic power supply 4a,4b, in particular the mains.

Heater 1 comprises a thermoblock or on-demand heater 12, that has a heater body with a chamber (not shown) for containing liquid, such as water, to be heated; a pair of electric heating elements in the form of resistors R1,R2 that are in thermal communication with the chamber for heating the liquid; and an electric heater connector 1a of the plug type with electric conductors 11 connected to electric heating elements R1,R2. Electric conductors 11 are disconnectably connectable to corresponding electric conductors 21 of output connector 2a,2b that is located at one end of connection device 2.

First resistor R1 is connected between a pair of conductors 11. Second resistor R2 is connected to one conductor of this pair of conductors 11, i.e. a common or shared conductor 11, and to a further or third electric conductor 11.

Heater 1 has a user-operable master switch 5 between conductors 11 and resistors R1,R2 and a low voltage circuit 6 connected via an AC/DC converter (not shown) that is connected to the mains 4a,4b via master switch 5, connector 1a and connection device 2.

Furthermore, the heater has a power regulation switch 7 extending between a pair of conductors 11 for connecting and disconnecting resistors R1,R2 so as to adjust the heat generation by heater 12. Regulation switch 7, e.g., a triac, is controlled by a control unit (not shown) included in low voltage circuit 6.

As shown, at the bottom of FIGS. 1 and 2, bottom conductors 11 and 21 are connectable and earthed.

In accordance with the invention, heating resistors R1,R2 are so connected to the heater conductors 11 as to be powerable in two connection configurations depending on the electric configuration within the connection devices 2.

More specifically, FIG. 1 illustrates a first connection configuration in which conductor 11 that is shared between resistors R1 and R2 remains in a disconnected state in connection device 2, whereas the other two conductors 11 connected to resistors R1 and R2 are connected to the power source 4a via the connection device 2. Hence, resistors R1 and R2 are in a serial configuration. The voltage of the mains, e.g., 220 VAC, is thus shared along resistors R1 and R2. If R1 and R2 are of equal value, the voltage drop along R1 and R2 is equivalent.

Moreover, on/off regulation switch 7 is in serial connection with resistors R1,R2 via a return loop 21' in socket connector 2a of connection device 2. Regulation switch 7 allows a fine adjustment of the power generated by resistors R1,R2 via a control unit in a low power circuit 6 by intermittently connecting and disconnecting resistors R1,R2. To improve the adjustment of the power generated by resistors R1,R2, low power circuit 6 may be arranged to measure the actual voltage of the power source 4a and operate switch 7 taking into account the actual voltage for powering resistors R1,R2, e.g., via a voltmeter.

Conversely, FIG. 2 illustrates the same heater 1 connected to the mains 4b having a lower voltage level, e.g., 110 VAC, via a second connection device with dedicated socket connector 2b of the connection device 2. As shown, resistors R1,R2 have each a terminal connected to a shared conductor 11. This connector 11 is further connected to a corresponding conductor 21 of socket connector 2b which is in turn connected via second loop 21" to control switch 7 and the mains 4b again via socket connector 2b of control device. The other terminals of resistors R1,R2 are also connected to the mains 4b via conductors 11 and facing interconnected conductors 21 of socket connector 2b so that R1 and R2 are in a parallel connection relative to the mains 4b.

It follows that unlike in the configuration of FIG. 1, the voltage drop each resistor R1,R2 is equivalent to the voltage of the mains 4b, instead of a fraction thereof. Hence, socket connector 2b is adapted for a connection configuration of resistors R1,R2 of heater 1 with a lower voltage source. This result is achieved by providing a connection device 2 that has a different electric configuration, without having to change the electric configuration of the heater 1.

When the voltage sources are, for instance 220 V in Switzerland and 110 V in the US, standard connectors 3a,3b of connection device 2 and 4a,4b of the power source will prevent mix up of the connection devices in the two places. Hence, the user will be directed to selecting the correct connection device 2 with the appropriate electric connection for resistors R1,R2 by the geometry and resulting connectability of the connection device in the respective places.

As can be seen in FIGS. 1 and 2, loops 21',21" are arranged and adapted to each connection configuration so that control switch 7 controls the powering of both resistors R1,R2.

Moreover, each plug connector 3a,3b is arranged, geometrically and mechanically, to be adjusted to the type of standard socket connector of the corresponding mains 4a,4b with the specific voltage source that corresponds to the electric configuration of the socket connector 2a,2b so as to provide the proper connection and powering for resistors R1,R2 of heater 1.

Furthermore, the control unit of low power circuit 6 may be arranged to measure the electric current passing, via control switch 7, e.g., by means of a hall sensor, and be arranged to disconnect the power circuit via switch 7 or another safety switch in case of malfunction or inappropriate use. Such an inappropriate use may result from a user trying to connect heater device 1 using the wrong connection device 2 via a plug adaptor. In this case, to avoid over powering or under powering of the resistors, the elevated power circuit containing these resistors may be disconnected. The lower power circuit 6 may continue to operate and can in particular indicate to the user via an interface (not shown) that he should use the connection device 2 adapted for the corresponding mains instead of trying to connect device 1 with the wrong connection 2 via an adapter.

To further reduce the risks of mistakes, connectors 1a,2a, 2b are preferably made non-standard so as to prevent any attempt by a user to take an unsuitable connection device or electric cord from another electric appliance for connecting heater 1.

Figure 3:
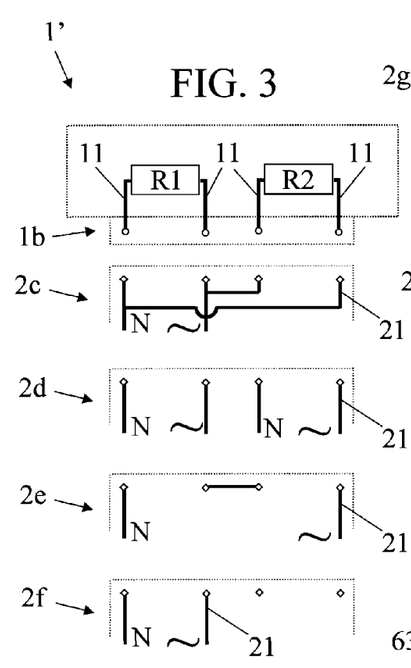
FIGS. 3 and 4 schematically illustrate alternative connection configurations of heaters and connection devices according to the invention.

FIG. 3, in which the same numeric references generally designate the same elements, illustrates a further embodiment of a heater 1' having a heater electric connector 1b facing various connector sockets 2c,2d,2e,2f, each dedicated for a different voltage source, in accordance with the invention.

In this embodiment of the invention, resistors R1,R2 do not share a common conductor 11. They are separately connected within the heater, each terminal of resistor R1,R2 being connected to a dedicated conductor 11 in heater 1'.

Below heater 1' are shown four different socket connectors 2c,2d,2e,2f of corresponding connection devices providing different power connection configurations of resistors R1,R2, adapted to be powered by power sources with different electric characteristics.

As can be seen from the connection configuration in FIG. 3, connector socket 2c leads to a parallel configuration of resistors R1 and R2 when connected to the means, symbolised by the signs N for the neutral polarity and ~ for the phase polarity of the power source.

Connector socket 2d also provides a parallel configuration of the resistors R1,R2. However, unlike in socket 2c, conductors 21 are not interconnected. Hence, such a connection configuration may also be adapted for a power source having at least two phases, e.g., a three-phase electric source.

Connector socket 2e provides a serial connection of resistors R1,R2, the resistors being interconnected via connector socket 2e.

Connector socket 2f provides an individual connection of one resistor R1, a resistor R2 remaining disconnected. As this leads to unequal use and wear of the resistors, or even a superfluous presence of resistor(s), this embodiment is less preferred. Obviously it is also possible to invert the connection of the resistors, i.e. connect resistor R2 and disconnect resistor R1. Such an inverted configuration may make sense when resistors R1 and R2 are of different values.

Figure 4:
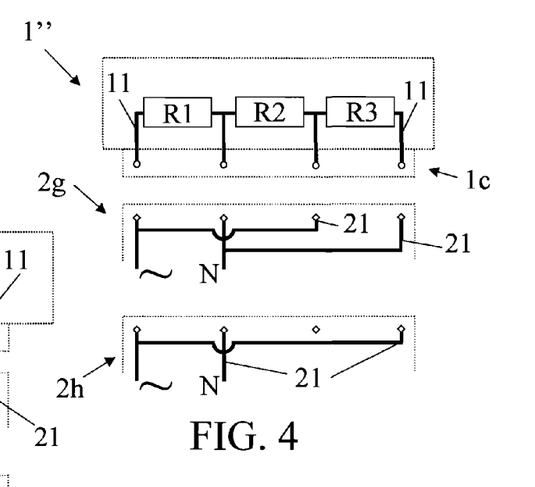

FIG. 4, in which the same numeric references generally designate the same elements, illustrates a further embodiment of a heater 1" having an electric connector 1c facing exemplary connector sockets 2g,2h, each dedicated for a different voltage source, in accordance with the invention.

Heater 1" includes three resistors R1,R2,R3 that may be connected to a power source in various different manners—depending on the characteristics of the power source—via a specifically adapted connection device with a dedicated connector socket 2g,2h. In other words, the specific connection configuration may be physically located in the output connector of the connection device. However, it is also possible to located such configuration at a different location in the connection device, e.g., in the input connector and/or between the input and output connector.

As illustrated, connector socket 2g provides a parallel configuration of resistors R1,R2,R3. With connector socket 2h resistors R2 and R3 are in a serial connection and resistor R1 is in a parallel connection with the serially connected resistors R2 and R3.

It will be apparent to the skilled person that many different parallel, serial and individual connections and combinations thereof may be provided via an appropriate connector socket. Adjusting the Similar Or Different Ohmic Values Of Two Or More Resistors Of A Heater Provides A Great Range Of possibilities of interconnections via appropriate connection devices and thus many different resistive ohmic values of the possibly resulting interconnections of the resistors or even individual connections of the resistors. Hence, such a system provides a simple means to adapt the resistive system of the heater device to align it to a variety of different electric power supplies. To make the system fool proof, the connection device should include a connector, typically a plug, to the power supply that is specifically adapted for connection with only one of the different connectors of the different power supplies, typically sockets.

Figure 5:
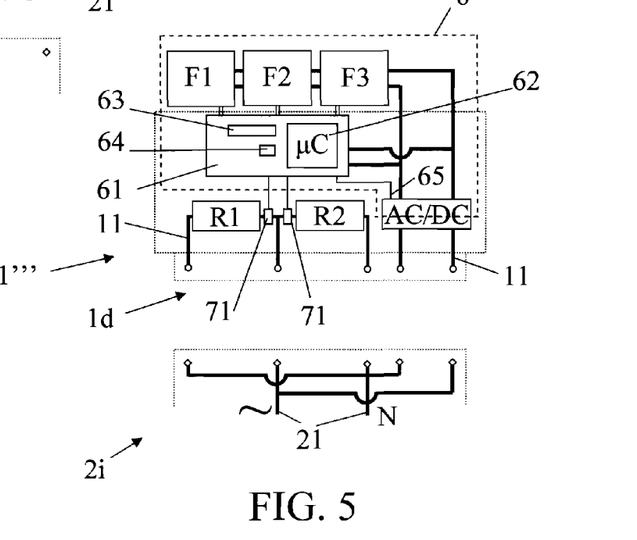
FIG. 5 schematically illustrates an electric circuit of a beverage machine with a heater and a connection device according to the invention.

FIG. 5, in which the same numeric references generally designate the same elements, illustrates a further embodiment of a heater 1'" with exemplary connector sockets 2g,2h, each dedicated for a different voltage source, in accordance with the invention. In this embodiment, the emphasis is put on a low voltage circuit 6 interconnected with heater 1''' rather than the resistor arrangement R1,R2 and its possible interconnections via connectors 1*d*,2*i* to a power source.

Low voltage circuit 6 is connected to the power source by an AC/DC converter via dedicated conductors 11 and connectors 1*d*,2*i*. The AC/DC converter may be arranged to adapt automatically to various different voltage sources. Such converters are known in the electric field and may be found for instance in or for mobile phones or other electric appliances such as laptop computers or the like. The AC/DC converter is arranged to convert the AC power supply from a power source into a DC voltage typically in the range of 2 to 30 VDC, for example 3, 5, 6, 10, 12, 15, 18, 20 or 24 VDC.

AC/DC converter is connected to functional units F1,F2,F3 external to heater 1''', and to a control unit 61, including a printed circuit board (PCB) that bears a controller 62, a memory chip 63 and a clock 64. Control unit 61 is connected via a series of signal lines 65 to functional units F1,F2,F3 and to a pair of power control switches 71 for controlling the powering of resistors R1,R2 and the operation of the functional units. Typically, functional units F1,F2,F3 include: a pump for circulating a liquid such as water from a liquid source, in particular a reservoir, via the heater body (not shown) bearing resistors R1,R2; a user input/output interface module; and a sensor arrangement such as a flow meter, temperature sensors . . . . The AC/DC converter may also include a voltage or current meter that is connected via a signal line 65 to control unit 61 for adjusting the control of power switches 71 to the actual characteristics of the power source. Power switches 71 may also serve as safety switches in case a voltage of the power source is detected that is inadequate with the connection configuration of resistors R1,R2 and/or their ohmic values.

What is claimed is:

1. A combination of a heating device with first and second connection devices, wherein:
the heating device comprises a heating chamber for containing a liquid to be heated; a plurality of heating elements that are in thermal communication with the heating chamber; and a heater connector having heater conductors connected to the heating elements;
the first connection device comprises a first output connector with conductors for connection to the conductors of the heater connector and a first input connector for connection to a first standard connector of a first power source having a first voltage level; and
the second connection device comprises a second output connector with conductors for connection to the conductors of the heater connector and a second input connector for connection to a second standard connector of a second power source having a second voltage level,
wherein the second input connector, standard connector and voltage level are different than the first input connector, standard connector and voltage level, respectively,
wherein the conductors of the first output connector have a first connection configuration in the first connection device and the second electric conductors of the second output connector have a second connection configuration in the second connection device that is different than the first connection configuration; and in that at least two of the heating elements are so connected to the first electric conductors as to be powered: in a first connection configuration via the first connection device to the first power source with the voltage level, and in a second connection configuration via the second connection device to the second power source with the second voltage level.

2. The combination of claim 1 wherein the liquid is water, the heating elements are electric heating elements or resistors.

3. The combination of claim 2, wherein the electric heating elements of the heating device have a nominal power that is substantially constant whether connected via the first connection device to the first power source with the first voltage level or whether connected via the second connection device to the second power source with the second voltage level.

4. The combination of claim 1 wherein the first and second output connectors are each a socket and the first and second input connectors are each a plug, wherein the first input connector is incompatible with the second standard connector and wherein the second input connector is incompatible with the first standard connector.

5. The combination of claim 1, wherein the connection configurations of the connection devices are permanent and non-modifiable by a user.

6. The combination of claim 1, wherein the electric configurations comprise one or more configurations of the at least two heating elements selected from an individual powering configuration, a parallel powering configuration, a serial powering configuration, a star configuration and a delta configuration and combinations thereof.

7. The combination of claim 1, comprising one or more circuit breakers, over-voltage fuses or electric safety switches.

8. The combination of claim 1, wherein the heater connector comprises electric conductors connected to a low voltage unit for powering a low voltage circuit.

9. The combination of claim 8, wherein the low voltage unit is associated with an AC/DC converter connected to the electric conductors.

10. The combination of claim 1, wherein the heating chamber for containing liquid is an in-line heating chamber comprising a heating conduit for guiding a circulating liquid to be heated.

11. The combination of claim 1, wherein the heating chamber for containing liquid is a heating reservoir for heating batches of liquid accumulated in the reservoir.

12. The combination of claim 1, which further comprises a beverage preparation machine that includes the heating device for heating liquid therein prior to dispensing a beverage, with the beverage preparation machine and heating device connectable to a selected power source via one of the connection devices.

13. The combination of claim 1, wherein the output connectors of the connection devices are disconnectably connectable to the heater connector.

14. A set of two connection devices suitable for a combination with a heating device that has a heating chamber, a plurality of heating elements that are in thermal communication with the heating chamber, and a heater connector having heater conductors connected to the heating elements, the set comprising:
a first connection device comprising a first output connector with conductors for connection to the conductors of the heater connector and a first input connector for connection to a first standard connector of a first power source having a first voltage level; and
a second connection device comprising a second output connector with conductors for connection to the conductors of the heater connector and a second input connector for connection to a second standard connector of a second power source having a second voltage level, wherein the second input connector, standard connector and voltage level are different than the first input connector, standard connector and voltage level, respectively, wherein the second electric conductors of the first output connector have a first connection configuration in the first connection device and the second electric conductors of the second output connector have a second connection configuration in the second connection device that is different than the first connection configuration; and wherein the connection configurations are so arranged that at least two of the heating elements connected to the first electric conductors are powered in a first connection configuration via the first connection device to the first power source with the first voltage level and in a second connection configuration via the second connection device to the second power source with the second voltage level.

15. The set of claim 14 wherein the liquid is water, and the heating elements are electric heating elements or resistors.

16. A combination of a heating device for a liquid food or beverage machine and a plurality of different connection devices for connecting the heating device to different power sources, wherein:

the heating device comprises a heating chamber for containing a liquid to be heated; a plurality of heating elements that are in thermal communication with the heating chamber; and a heater electric connector having conductors connected to the heating elements;

each connection device comprises:

an output connector with conductors that are connectable to the heater electric conductors; and an input connector that is configured to be connectable to a standard power supply connector of a voltage supply of an area having a specific nominal domestic voltage level;

wherein the different connection devices have different power source connectors dedicated to different standard power supply connectors of different voltage sources with corresponding different voltage levels, with at least two of the heating elements connected to the heater conductors so as to be powered in at least two connection configurations that depend on an electric configuration of the conductors of each connection device, and with the electric configuration of each connection device being adapted to its power source connector that is dedicated for the power supply connector of each different voltage supply.

17. The combination of claim 16 wherein the output connectors are each a socket and the input connectors are each a plug, wherein the input connectors compatible with only one power source connector, and further wherein the liquid is water, and the heating elements are electric heating elements or resistors.

18. A combination of a heating device or a liquid food or beverage machine and a connection device for directly connection of the heating device to a dedicated power sources, wherein:

the heating device comprises a heating chamber for containing a liquid to be heated; a plurality of electric heating elements that are in thermal communication with the heating chamber; and a heater connector with conductors connected to the heating elements, the connection device comprises an output connector with conductors that are disconnectably connectable by a user to the conductors of the heating device, and an input connector that is configured to be connectable directly to a standard power supply connector of a voltage supply of an area having a specific nominal domestic voltage level, at least two of the heating elements are so connected to the heater conductors as to be powered in a connection configuration that depends on an electric configuration of the conductors in the connection device, with the electric configuration in the connection device being permanent, non-modifiable by a user and adapted to its input connector that is dedicated for said power supply connector of the voltage supply.

19. The combination of claim 18, further comprising a further connection device comprising:

an output connector with conductors that are connectable to the conductors of the heating device; and an input connector that is configured to be connectable directly to a standard power supply connector of a voltage supply of an area having a specific nominal domestic voltage level, a connection configuration for connection the heating elements to a further power source having a different voltage level, wherein the connection devices have different electrical configurations, different input connectors dedicated for direct connection to different standard power supply connectors of different voltage sources with corresponding different voltage levels.

20. The combination of claim 19 wherein the output connectors are each a socket and the input connectors are each a plug, wherein the input connectors compatible with only one power source connector, and further wherein the liquid is water, and the heating elements are electric heating elements or resistors.

* * * * *